United States Patent [19]
Oeckl

[11] 3,765,786
[45] Oct. 16, 1973

[54] ADJUSTING DEVICE FOR MULTIPLE SPINDLE BORING HEADS

[76] Inventor: Otto Oeckl, Tizianstrasse 60, Munich, Germany

[22] Filed: Sept. 28, 1971

[21] Appl. No.: 184,415

[30] Foreign Application Priority Data

Sept. 30, 1970 Germany............P 20 47 991.8

[52] U.S. Cl.................... 408/46, 408/3, 408/48, 408/53
[51] Int. Cl....................... B23b 39/20, B23b 39/34
[58] Field of Search ..................... 408/46, 53, 42, 3, 408/48

[56] References Cited
UNITED STATES PATENTS

| | | | |
|---|---|---|---|
| 1,835,539 | 12/1931 | Thomas | 408/46 |
| 1,677,999 | 7/1928 | Boax et al. | 408/46 |
| 875,979 | 1/1908 | Bocorselski | 408/46 |

FOREIGN PATENTS OR APPLICATIONS

| | | | |
|---|---|---|---|
| 78,257 | 2/1894 | Germany | 408/46 |

*Primary Examiner*—Gil Weidenfeld
*Attorney*—Francis D. Stephens et al.

[57] ABSTRACT

A multiple-spindle boring head has spindle supports which are independently adjustable both annularly and diametrically on a frame and over overlapping areas.

6 Claims, 4 Drawing Figures

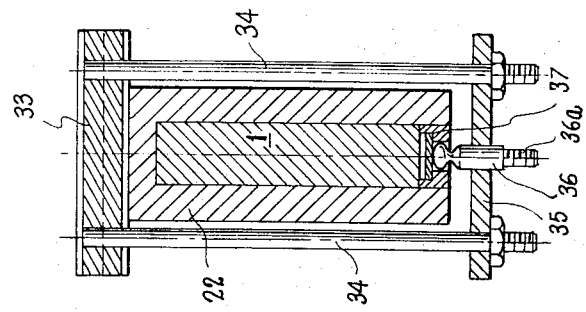
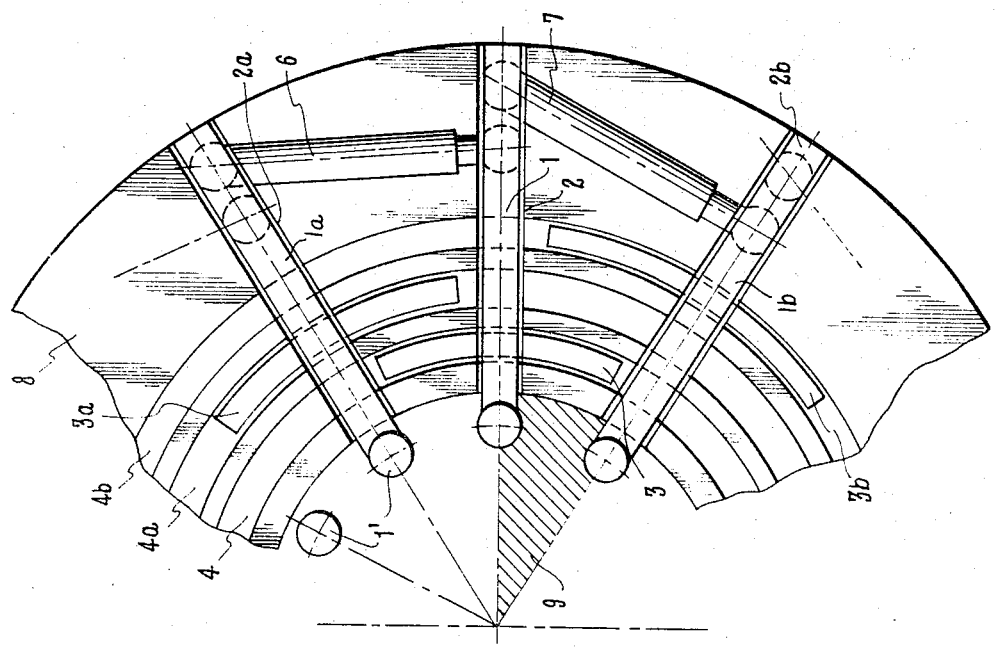
INVENTOR
Otto Oeckl

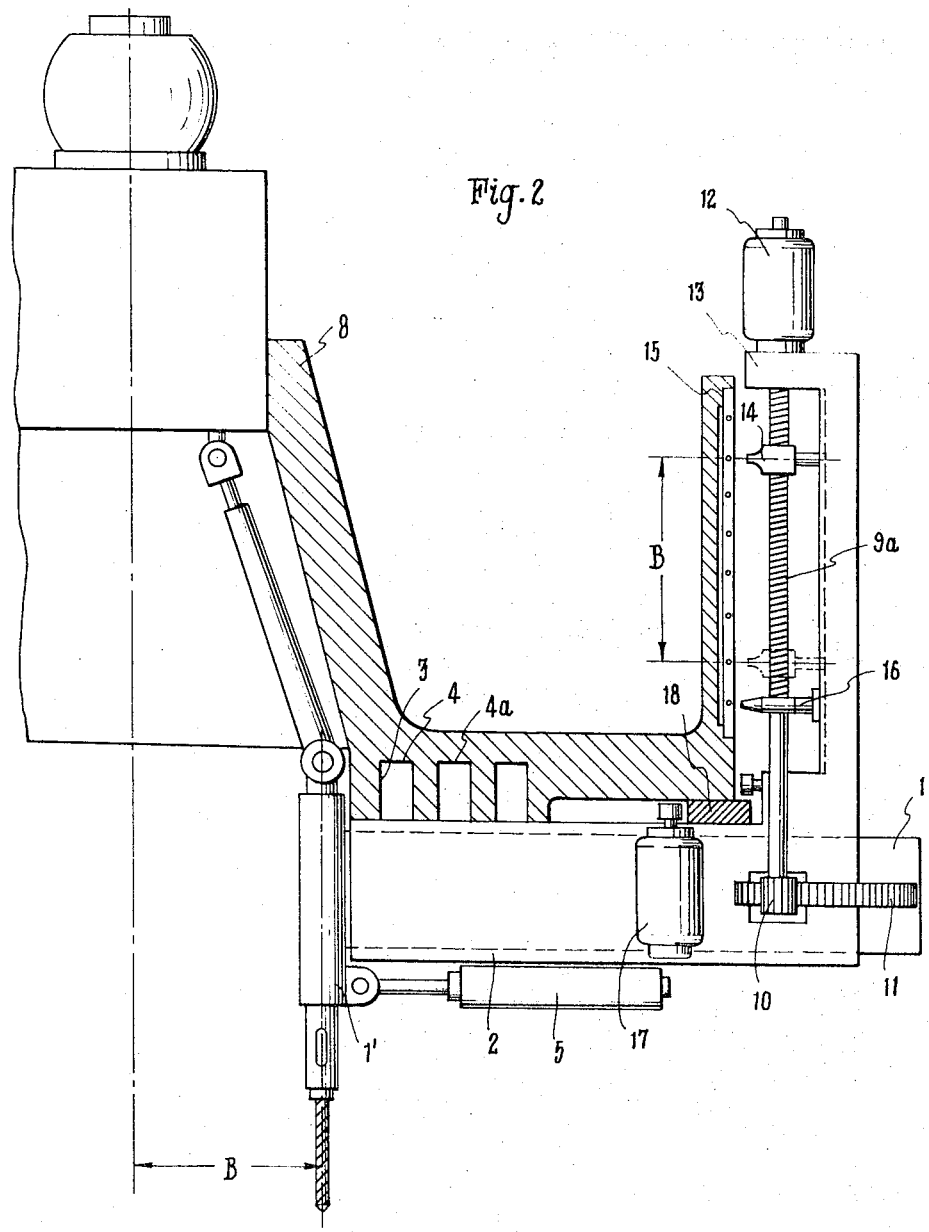

INVENTOR
Otto Oeckl

ADJUSTING DEVICE FOR MULTIPLE SPINDLE BORING HEADS

This invention relates to an adjusting device for multiple-spindle boring heads of the type in which, for the making of a diversity of boring patterns, circularly arranged parallely disposed boring spindles are adjustable independently of each other in peripheral direction of the circle as well as radially thereto. This invention concerns, therefore, an adjusting device which positions the individual spindle according to polar coordinates.

The object of this invention is to improve solutions of the problem in such a way that the number of possible boring patterns is increased, and particularly that holes can be bored without further adjustment extremely close to each other on a circle of holes.

In general, these objects are obtained in this invention by providing each of a number of contiguous boring spindle supports, each adjustable in the radial direction by one means and also adjustable by a seperate means in the peripheral direction of a circle of boring spindles, namely, in sectors overlapping each other in the peripheral direction. This is done by use of different annular grooves arranged at different distances from the center of the boring spindle circle for each spindle support guide. The chief advantage of this arrangement consists in the ability to bore holes positioned on the same circle of holes at extremely close distances. A particular easy adjustability of the boring spindle supports permits a very precise setting of each boring pattern according to a prespecified boring program without the use of a boring template. The shifting means, which may be motors, may be controlled by means of a perforated-tape system.

Although the perforated-tape controlled positioning of the boring spindles would be carried out rapidly and accutrately, the manufacturing expense and, therefore, the cost of a machine tool provided with such positioning devices are not justified in all cases, especially in cases where the length of time required for positioning the boring spindles is of no importance if the machine is not usually utilized to capacity.

Therefore, a further development oF this invention is to provide a simplified positioning device characterized in that the positioning of the boring spindle supports in radial direction is carried out by means of precisely gauged rods in the manner of end measures against which the boring spindle support strike, while the positioning in peripheral or circumferential direction takes place by manual means using a scale arranged at the outer periphery of the machine frame, with provision, in both cases, of threaded means for the positioning movements.

The chief advantage of this invention consists in the achievement of great accuracy for the positioning boring spindles at very low construction cost, namely, in the radial direction according to the precision of the prefabricated end measure gauges, and in peripheral direction on the basis of the arrangement of the measuring scale on the periphery of the machine, which permits a very fine graduation of this scale and a very precise adjustment without further aid of the arcuate movement of the boring spindle supports. A further advantage consists in the simple operation of the positioning device of this invention not requiring skilled machinists. In order to position the tool, it is simply necessary to insert, for setting the diameter coordinate, the suitable end measure and to operate the threaded means, either by hand or from an auxiliary mechanism, until the boring spindle support strikes against the end measure. The peripheral coordinate is also adjusted likewise by actuating the worm gear drive provided therefore until the required arc measure is set on the scale.

In an advantageous further development of this invention the fixing of the boring spindle supports in the operating position takes place by means of a clamping device in which, by means of tie rods and tightening screws, the boring spindle supports are clamped against the machine frame. This simple but efficacious clamping device serves also to keep the manufacturing cost low for the adjusting device of the invention.

According to a further feature of this invention, the driving spindles of the threaded means, the worm drive and the tightening screw of the clamping device are provided with stem heads which are alike. This makes it possible to actuate all three moving elements with the same wrench without a readjustment thereof.

The means by which the objects of this invention are obtained are described more fully with reference to the accompanying drawings, in which:

FIG. 1 is a somewhat diagramatic botton view of an adjusting device for the main spindles in a boring machine;

FIG. 2 is a cross-sectional view somewhat diagramatic with automatic adjusting means;

FIG. 4 is a section along line IV—IV of FIG. 3.

Figure 3:
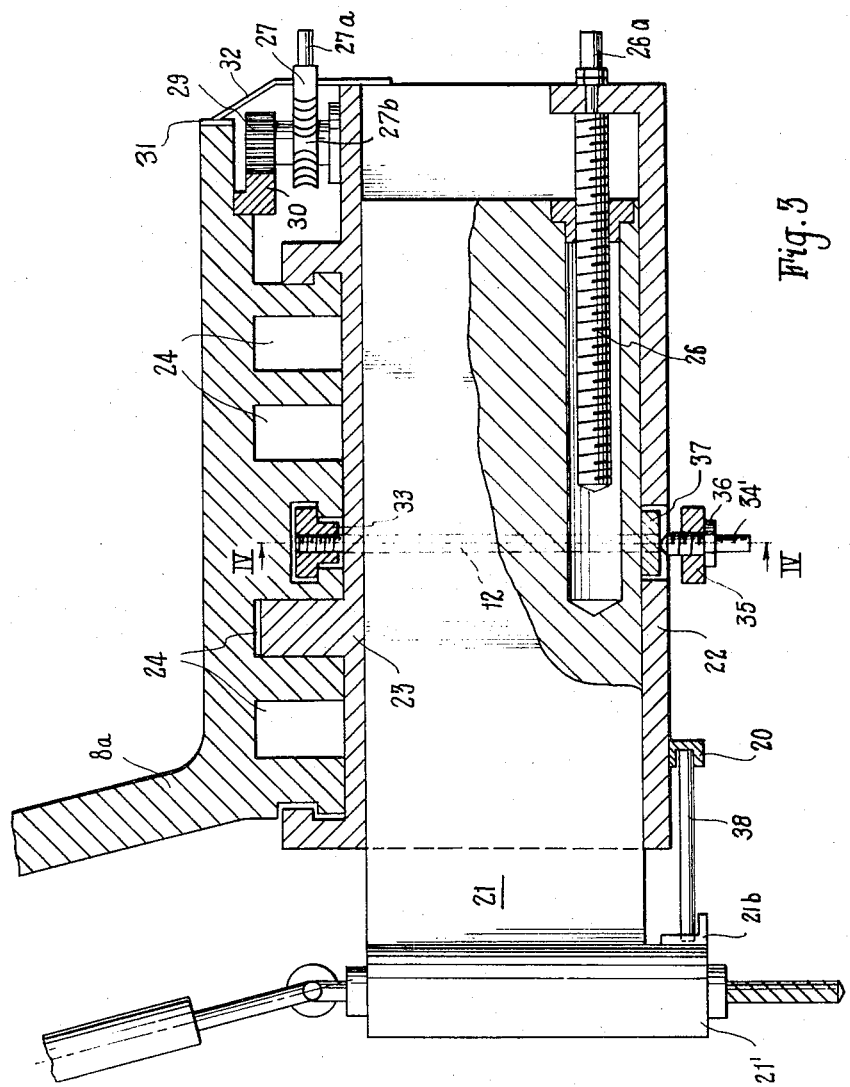
FIG. 3 is a longitudinal section through a modified manually adjusted device of this invention.

In FIG. 1 radial arm 1 supports a boring spindle proper 1' and is itself supported in a guide 2 so as to be radially movable toward the boring pattern center. Guide 2 is provided with a slide arm 3, shaped as an arc, which moves in a groove 4 in a circular path at a first radial distance from the boring pattern center. Likewise, circular grooves 4a and 4b at different radial distances each serve for holding a further circular arc shaped arm 3a or 3b with corresponding spindle supporting means. The radial movement of support arm 1 takes place, e.g., by a hydraulically actuated piston cylinder unit 5, FIG. 2. Likewise, hydraulically actuated piston cylinder units 6, 7, FIG. 1, produce the movement of guides 2 in a radial direction with respect to the boring pattern center, i.e., in the direction of a horizontal circular arc, FIG. 1. Three support arms 1, 1a and 1b, with their guides are shown in the end position of a possible boring pattern, i.e., in the initial position, FIG. 1. The boring machine frame 8 is provided with three circular arc shaped grooves 4, 4a and 4b, wherein circular arc shaped slide arms 3, 3a and 3b of guide 2, 2a and 2b move at a radial distance from the boring pattern center. The guides are shown by way of example in their initial position while the pistons of the piston cylinder unit 6, 7 has, when its piston is in extended position, a path of such length that, e.g., guide 2b can be moved into the initial position of guide 2. Each piston cylinder unit 6, 7 is connected at one end, e.g., cylinder, with boring machine frame 8 and the other end, e.g., piston, with one of guides 2, 2a and 2b.

The connecting points of the piston cylinder units are somewhat staggered so as to avoid a contact between the cylinders in the extended state. Thus, each guide 2, 2a and 2b can cover an area which corresponds to the shaded field 9.

For adjustment of boring spindles 1' the axes of which are normal to the plane of frame 8, corresponding to a required boring pattern, aperforated tape 15 is provided, FIG. 2. In this structure guide 2 and analagous guides 2a and 2b are provided with a vertical extension 13 on which the drive motor 12 is mounted. The movements taking place, at a radial distance from the boring pattern center, in peripheral direction of the circle of holes are controlled by command signal receiver 16 by means of which a drive 17 is set in motion for the circular movements at different radial distance from the boring pattern center. Perforated tape 15 has, e.g., openings, slots, or the like, which are scanned by known means, such as selenium cells or air nozzles, as command signal receivers. When the required movement path carried out from the boring pattern center at a radial distance is reached, motor 17 is automatically shut off. A circumferentially arranged ring gear 18 with internal toothing engaged by the pinion of drive motor 17 may be used to produce the circular movement of guides 2 together with arms 3 corresponding to the path of movement in each case. The radial movement when using perforated tape 15 and sensing means 14 is produced by a motor 12 switched on and off by command signal receiver 14 and, thus, driving by way of a worm gear 9a a pinion 10 which engages gear 11 to drive support arm 1.

Path "B" travelled by command signal receiver 14 in this case corresponds to radial path "B" of the boring spindle with the boring tool. That is to say, a path of 1 mm on the command signal tape corresponds to a path of 1 mm on the radial advance. Thus, the machine can be constructed to operate fully automaticaly.

Guides 2, 2a and 2b may be moved peripherally by manual means or by piston cylinder means 6, 7 or by electric motors and the radially moving support arms 1 can be driven manually or by hydraulic piston cylinder units 5, electric motors, or the like. The mechanical driving means in connection with perforated tape controls 12, 13, 14 and 15 make the operation of the boring machine fully automatic.

In the modification of FIGS. 3 and 4, several annular grooves 24 are again arranged in the machine frame 8a so as to extend concentrically about the center axis M and to hold circular arc shaped sliding arms 23 which are rigidly connected with radial guides 22 of boring spindle support arm 21. Inside radial guides 22 in each case a boring spindle support 21 slides on whose radially inner end a boring spindle 21' is mounted. The radial advance of the boring spindle support arm 21 toward the machine center axis M is produced by threaded drive means 26. The stem of this means 26 has a square head 26a upon which a suitable driving device, e.g., a wrench driven by compressed air or other motor can be mounted, which effects the coarse adjustment of boring spindle support 21. Boring spindle 21' has a stop 21b, and radial guide 22 has a stop 20, which stops are positioned on a radius with relation to axle center axis M. End measure or distance pieces 38, which determines the adjustment of the radial coordinate of boring spindle 21', is inserted between these two stops 21b and 20.

Boring spindle 21' is positioned in peripheral direction by pivoting radial guides 22 with their arms 23 by means of a worn gear drive 27 in the concentric annular grooves 24. The stem 27' of worm gear drive 27 is provided with a square head having the same size as square 26a. A pinion 29 is fixed to the worm gear of worm gear drive 27, pinion 29 meshes with a toothed ring 30 provided on the periphery of machine frame 8. Indication of the peripheral position is obtained by a scale on the periphery of machine frame 31 and of a pointer 32 mounted on radial guide 22.

The fixation necessary for the operation of spindle 21 is carried out by means of a clamping device which clamps boring spindle support 21 and radial guide 22 to machine frame 8. Two tie rods 34, 34' are fastened to yoke 33 below radial guide 22 by yoke 35. A tightening screw 36 is screwed into the lower yoke 35. This tightening screw 36 presses against a pressure plate 37 which in turn is positioned in a recess of radial guide 22 and rests against boring spindle support 21. Tightening screw 36 is provided with a square head.

Adjustment of the machine to a changed boring pattern requires, therefore, for each boring spindle support an end measure 38 and a table of information according to which the arc measure necessary for each boring spindle support can be set. First of all, radial guide 22 are adjusted in the peripheral direction to the required arc position, in which boring spindle supports 21 should be. Then the end measure 38 that corresponds to the required radial coordinate is inserted between stops 21b and 20. The boring spindle support 1 is moved to contact the end measure. Finally, boring spindle support 1 is fixed in the proper position by means of the tightening screw 36. The adjustment of the two spindle drives and the tightening as well can be carried out by means of a wrench, e.g., a wrench which fits on all three square heads of the stems or screws to be turned.

Having now described the means by which the objects of the invention are obtained,

I claim:

1. In a boring machine of the type adapted to bore parallel holes in a work piece, said machine supporting a plurality of parellel boring spindles, an arcuate fixed frame, a plurality of concentric arcuate grooves in said fixed frame, an arcuate slide arm slidably mounted in each said arcuate groove, a radial guide mounted on each said arcuate slidearm so that each said radial guide may be moved arcuately on said frame, a boring spindle support carrying each of said boring spindles and being slidably mounted in each said radial guide for radial movement therein, means to move and accurately position each said radial guide within a sector of said arcuate frame and means to move and accurately position each said boring spindle support in its guide.

2. In a device as in claim 1, further comprising separate motor means to adjust each said radial guide on said frame, perforated tape means for controlling said motor means.

3. The boring machine of claim 1, in which the means to move each said spindle support in its radial guide comprises manual means, a stop on said guide and a stop on said spindle support, and at least one interchangeable accurately sized end measure selectively disposable between said stops to accurately position said spindle support in its said radial guide.

4. The boring machine of FIG. 1, in which each said radial guide is provided with means for driving a pinion meshing with a ring gear on said fixed frame, said radially extending guide carrying a means to position said spindle support in said radially extending guide.

5. In a device as in claim 4, further comprising tie rod and tightening screw means for fastening said spindle support in operating position on said frame.

6. In a device as in claim 5, said worm gear means and said tightening screw means having square headed stems having equally sized square heads.

* * * * *